July 28, 1964
G. W. GRANT
3,142,797
TEST APPARATUS FOR AUTOMOBILE GENERATORS, ALTERNATORS AND VOLTAGE REGULATORS
Filed April 20, 1961
2 Sheets-Sheet 1
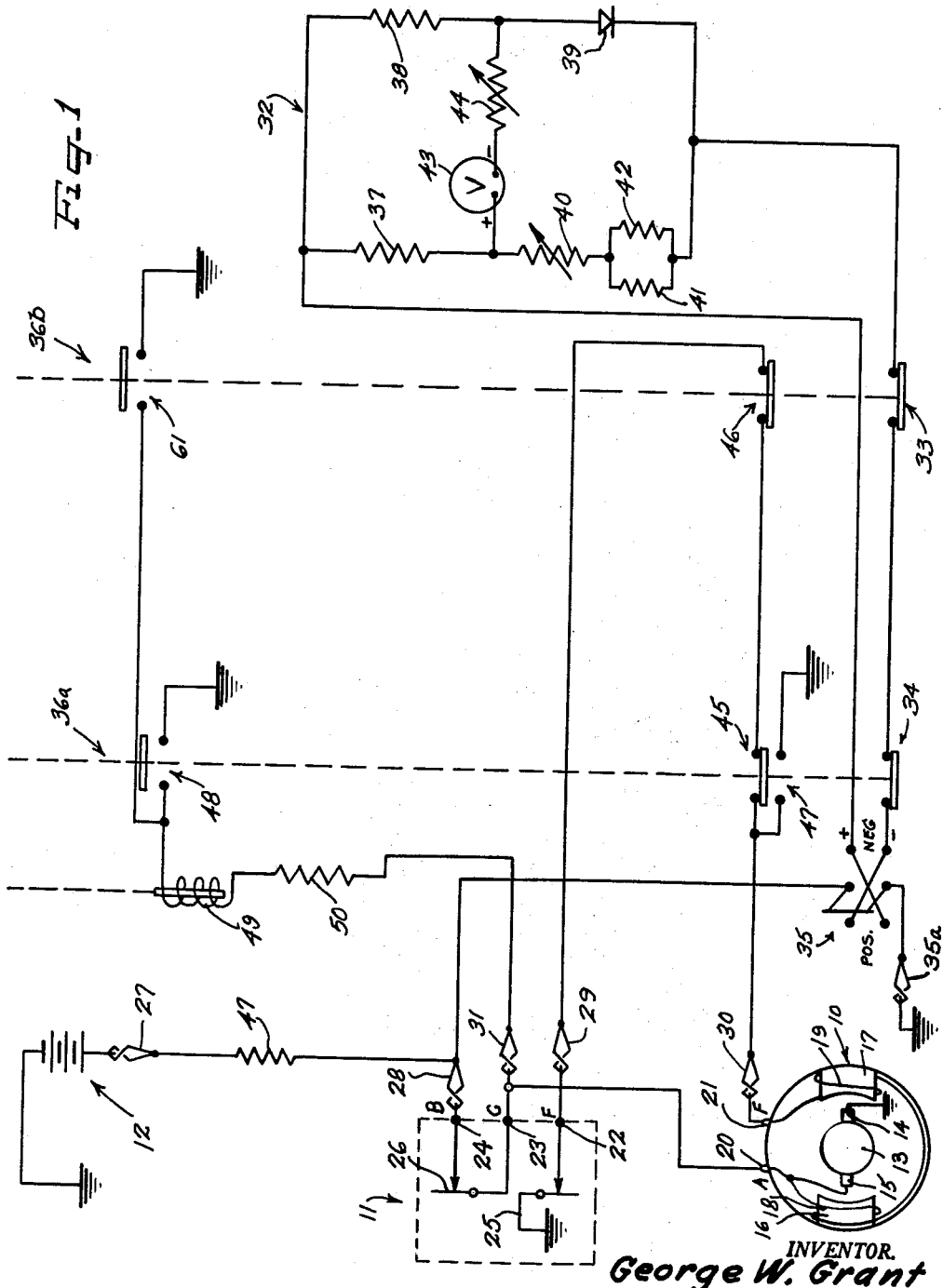
INVENTOR.
George W. Grant
BY
Hill, Sherman, Meroni, Gross & Simpson
ATTORNEYS July 28, 1964 G. W. GRANT 3,142,797
TEST APPARATUS FOR AUTOMOBILE GENERATORS, ALTERNATORS
AND VOLTAGE REGULATORS
Filed April 20, 1961 2 Sheets-Sheet 2
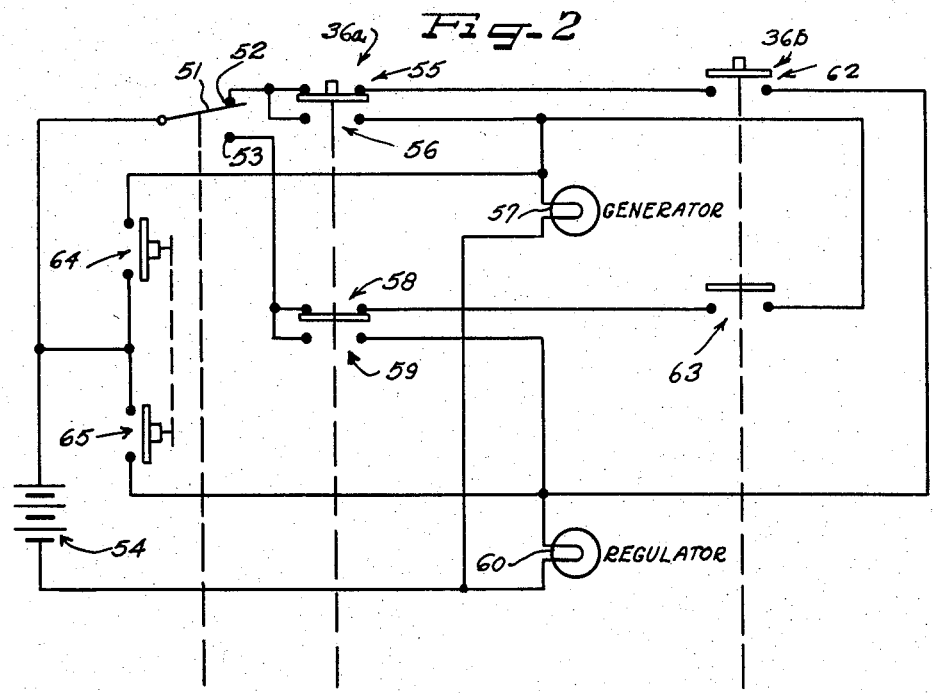
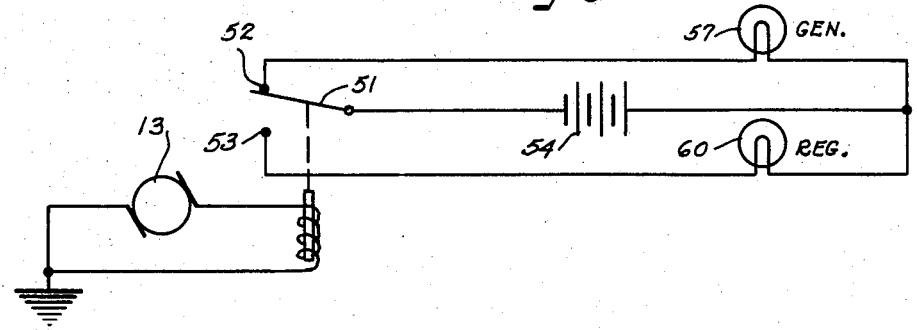
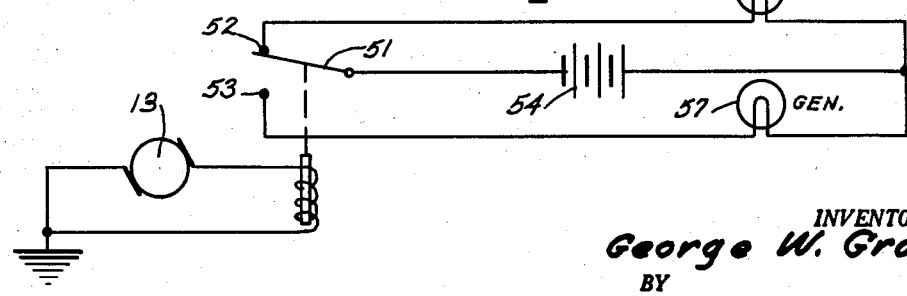
INVENTOR.
George W. Grant
BY
Hill, Sherman, Meroni, Gross & Simpson
ATTORNEYS

United States Patent Office 3,142,797
Patented July 28, 1964

3,142,797
TEST APPARATUS FOR AUTOMOBILE GENERATORS, ALTERNATORS AND VOLTAGE REGULATORS
George W. Grant, 8625 Skokie Blvd., Skokie, Ill.
Filed Apr. 20, 1961, Ser. No. 104,366
3 Claims. (Cl. 324—73)

This invention relates to an apparatus for testing electrical systems and, more particularly, to an apparatus for automatically testing automotive generators, alternators and voltage regulators.

Test instruments constructed in accordance with the invention are designed to be connected into the portion of an automotive electric circuit that includes the battery, voltage regulator and generator, and to determine whether the regulator and the generator are in satisfactory operating condition. Mechanisms now in general use for this or analogous purposes have included simply voltage or current meters which are connected into this circuit to determine these values at various points. These mechanisms have, of course, required relatively skilled and experienced operators who are able to correlate the various voltage and current readings and determine which component in the circuit is defective and is the cause of either an abnormally high or low meter reading. In fact many experienced mechanics become confused after a series of meter readings have been taken because the reasoning required to pinpoint the source of trouble becomes too complicated.

Accordingly, it is a general object of this invention to provide an improved method and apparatus for testing voltage regulators and generators for automobiles so constructed and comprising constituent parts having such characteristics that the difficulties or limitations inherent in such testers previously used for the same general purposes are eliminated or minimized.

It is another object of this invention to provide a test apparatus and method for automotive voltage regulators and generators which, after being connected into the automotive battery, voltage regulator and generator circuit, will indicate the defective component with a minimum amount of manipulation and reasoning by the operator.

It is still another object of this invention to provide a test apparatus for voltage regulators and generators that is rugged and reliable in operation and very simple to operate.

These and other objects of the invention are attained by providing a test apparatus that is connected into the automotive system by breaking the previous connection between the automobile battery and the voltage regulator and the connection between the generator field and the voltage regulator, and connecting the test apparatus in between these elements and to the coupling between the generator armature and the voltage regulator. The test apparatus includes a meter that measures the magnitude of the generator output voltage on the battery side of the voltage regulator. If the operator notes that the meter reading is too low, he presses a first button which disconnects the meter circuit and connects the generator field circuit directly across the generator armature, and connects a relay coil in the test apparatus to the generator output. Then, with direct excitation, if the generator output voltage is insufficient to trip the relay a first lamp will light and indicate that the generator is defective. On the other hand, if the generator output voltage increases with direct excitation, the relay will trip and another lamp will be energized indicating that the voltage regulator is defective.

If the operator initially notes that the meter indicates too high a voltage output from the generator he presses a second button which disconnects the field circuit of the generator. Then, if the generator output voltage remains high even with the field disconnected, the relay will again trip and energize the lamp associated with a defective generator, while if the generator voltage drops off when the field is disconnected the relay will not trip and the other lamp will be energized which is associated with a defective regulator.

It can be seen that all that is required of the operator is to connect the test apparatus into the automobile electrical circuit, note the meter reading and, if it is outside of predetermined limits, press one of two buttons. A light will then go on which notifies him whether it is the generator or the voltage regulator that is not operating properly.

This invention may be better understood and other objects, features and advantages more apparent from the following detailed description taken in conjunction with the accompanying figures of the drawings, in which:

FIGURE 1 is a schematic electrical diagram of a portion of the test apparatus constructed in accordance with the invention;

FIGURE 2 is a schematic electrical diagram of the remainder of the test apparatus;

FIGURE 3 is a simplified schematic diagram illustrating the operation of the apparatus when a low voltge meter reading is initially obtained; and FIGURE 4 is a simplified schematic diagram illustrating the operation of the apparatus when a high voltage meter reading is initially obtained.

As shown on the drawings:

FIGURE 1 is a schematic illustration of the test apparatus showing the connections to the automobile generator 10, the voltage regulator 11, and the battery 12. The generator 10 includes an armature 13 having brushes 14 and 15, two poles 16 and 17 around which field coils 18 and 19 are wound. An armature terminal 20 is connected to the brush 15 and to one side of the field coils, and a field terminal 21 is connected to the other side of the field windings. The brush 14 is connected to a common ground potential.

The voltage regulator 11 illustrated is any commercial type that has field, generator and battery terminals 22, 23 and 24, respectively. The electrical connections inside of the regulator 11 are shown very simplified. The field terminal 22 is connected to the common ground potential through a first relay 25 and the battery and generator terminals 23 and 24 are connected together through a second relay 26. It should be understood that the illustration in FIGURE 1 is a very simplified form of a voltage regulator and that standard voltage regulators may include additional relays and the means to energize them.

Under ordinary operating conditions of the automobile, the negative terminal of the battery 12 is connected to the ground potential and the positive terminal of this battery is connected to the battery terminal 24 of the voltage regulator 11. The armature terminal 20 of the generator 10 is normally connected to the generator terminal 23 of the voltage regulator and the field terminal 21 of the generator is connected to the field terminal 22 of the voltage regulator.

When a system of this type is to be tested, the positive terminal of the battery 12 is disconnected from the battery terminal 24 of the voltage regulator 11 and a first coupling 27 from the test apparatus is connected to the battery and a second coupling 28 is connected to the regulator. Also, the connection between the field terminal 21 on the generator 10 and the field terminal 22 on the voltage regulator is broken and third and fourth couplings 29 and 30 from the test apparatus are connected in their place. Finally, a fifth coupling 31 from the test apparatus is fastened to the connection between the armature terminal 20 on the generator 10 and the generator terminal 23 on the voltage regulator 11.

A system of this type is first tested by measuring the magnitude of the voltage output of the generator 10 on the battery side of the regulator 11. This is accomplished by a metering circuit 32 that is connected to the coupling 28 through two normally closed sets of contacts 33 and 34, and a double-pole double-throw switch 35. The switch 35 is provided to reverse polarity so that automobiles having either the positive or negative battery terminals grounded can be tested. The contacts 33 and 34 are parts of two multiple contact manually operable switches 36a and 36b which will be discussed in greater detail hereinafter. One side of the switch 35 is connected to the coupling 28 and the other side is connected through a sixth coupling 35a to the automobile ground.

The metering circuit 32 is adapted to measure voltage and includes two resistors 37 and 38 in two of its branches, a rectifier 39 in a third branch, and a variable resistor 40 which is connected in series with the parallel combination of a fixed resistor 41 and a non-metallic silicon carbide electrical resistor 42 of the type sold by Carborundum Company under the trade name "Globar." The electrical resistance of the resistor 42 changes with temperature and is provided to compensate for temperature variation encountered during operation. A suitable suppressed scale direct current voltmeter 43 is connected in series with a variable resistor 44 across the bridge circuit.

As previously stated, the initial step in testing an automobile electrical system is to fasten the five couplings 27–31 to the proper terminals. The operator then determines whether the positive or the negative terminal of the battery 12 is grounded to the automobile frame and places the switch 35 in the proper position. The metering circuit 32 is then placed across the armature 13 through the coupling 28, the contacts 33–35, and ground. The voltmeter 43, therefore, measures the amplitude or magnitude of this voltage output of the generator 10.

It will be noted that although the connection between the two field terminals 21 and 22 on the generator 10 and the voltage regulator 11 was broken and the test apparatus inserted between them, the field circuit remains substantially as before since there is a direct connection between the two terminals 21 and 22 through two other sets of normally closed contacts 45 and 46. Also, the battery terminal 24 of the regulator 11 is still connected to the positive terminal of the battery 12 through a fixed resistor 47. The value of this resistor is in the order of 0.25 to .50 ohms.

Therefore, it can be seen that the magnitude of the voltage developed across the armature 13 will be substantially the same as would be developed if the generator 10 were operating under normal conditions with a fully charged battery, so that the operator can look at the meter 43 and get an accurate indication of the voltage being developed. The dial of the voltmeter 43 is preferably divided into three sections. If the automobile being tested uses a six-volt system, the voltmeter 43 scale is preferably calibrated between six and eight volts, and the area of the scale between six and seven volts is labeled to indicate that the generator voltage output is too low. In the portion of the scale between 7.6 and 8 volts, the voltmeter dial is labeled to indicate that the generator voltage output is too high, and the portion of the dial between 7 and 7.6 volts is labeled to indicate that the voltage is in the correct area and that the generator and voltage regulators are both operating properly. These three portions of the dial are preferably colored for easy identification.

Of course, if the automobile uses a twelve volt system the circuit can be easily modified and a second scale marked on the dial. The circuit modification may simply include a single-pole double-throw switch that is connected to bring an additional resistance into one of the lines between the switch 35 and the metering circuit 32 when testing a twelve volt system.

If the meter 43 reading is in the center or acceptable portion of the scale, the operator knows that the generator and the voltage regulator are both operating properly and he disconnects the test apparatus from the generator, the voltage regulator and the battery and replaces the broken connections. On the other hand, if the meter 43 reading is too low, the operator manually operates the switch 36a and if the meter reading is too high he operates the switch 36b.

Assuming first that the voltmeter 43 has indicated a low voltage output and the operator presses the switch 36a, the contacts 34 open and disconnect the metering circuit 32. Connection is also made between the field terminal 21 on the generator 10 and ground through the now closed contacts 47, so that the field windings 18 and 19 are connected directly across the armature 13. Another set of contacts 48 are also closed when the switch 36a is operated which connects the armature terminal 20 of the generator 10 to ground through the operating winding 49 of a single-pole double-throw relay 49 and a resistor 50. In summary, the metering circuit 32 is disconnected, the field windings 18 and 19 are shunted directly across the armature 13, and the current output of the armature is fed through the operating winding 49. The rating of the relay is such that its movable contacts 51, FIGURE 2, will remain in electrical contact with the upper stationary contact 52 if the generator voltage remains low but it will trip to the lower stationary contact 53 if the generator 10 voltage increases substantially.

The movable contact 51 of the relay is connected to one pole of an instrument battery 54. The upper stationary contact 52 of this relay is connected to the contacts 55 and 56 of the switch 36a. If the generator voltage remains low and the movable contact 51 stays in the upper position, the battery 54 is connected through the closed contacts 56 to an indicator light 57 which is labeled on the test instrument "faulty generator." Therefore, if the light 57 is energized the operator knows immediately that the generator is not operating properly since its voltage output is low even with direct excitation.

On the other hand, if the voltage output of the generator rises when it is directly excited it will produce sufficient current to trip the relay and cause the movable contact 51 to move to the lower contacts 53. This lower contact is connected to the sets of contacts 58 and 59. The battery 54 is, therefore, connected through the closed contacts 59 to a second indicator light 60 which is labeled "faulty regulator." When this light 60 goes on the operator knows that the generator 10 is in satisfactory operating condition since it operates properly when it is directly excited and that it must be the voltage regulator 11 that was the cause of the low voltage reading on the meter 43.

If the operator initially observed a voltage reading on the meter 43 that was higher than desired and is in the upper portion of the meter scale, the operator proceeds by operating the switch 36b. This action opens the normally closed contacts 33, FIGURE 1, and again opens the line to the metering circuit. At the same time, the normally closed contacts 46 open and disconnect the circuit to the field windings 18 and 19, and close normally open contacts 61 which are connected in series with the relay winding 49. Then, with the armature 13 output connected to the operating winding 49, the relay will trip if the generator voltage remains high and will remain in its normal position if the generator voltage output drops off with no excitation.

If the relay remains in its normal position where the contacts 51 and 52 make contact, the battery 54 in the test apparatus is connected to the indicator light 60 through the normally closed contacts 55 and the now closed contacts 62. This indicates to the operator that the regulator is not operating properly since the generator output voltage dropped as soon as the excitation was removed. On the other hand, if the voltage output of the generator 10 remains high and the relay trips, the battery 54 will be connected to the indicator light 57 through the normally closed contacts 58 and the now closed contacts 63. Accordingly, the operator is notified that the generator 10 is at fault since its voltage output continues to be high even after the field winding circuit is broken.

The test apparatus also includes means whereby the two indicator lights 57 and 60 can be tested prior to operation. This is accomplished by two push button switches 64 and 65 which may, if desired, be mechanically coupled together as shown. When the switch 64 is closed the battery 54 is connected directly to the indicator light 57 and when the switch 65 is closed the battery 54 is connected directly to the indicator light 60. Of course, if either of these lights 57 or 60 fail to operate when these buttons are pressed the operator is immediately alerted to the fact that one of the lights has burned out.

FIGURES 3 and 4 are simplified schematic diagrams of the relay and indicating light circuits for the low and the high conditions. With specific reference to FIGURE 3, if the initial meter reading is too low the generator armature is connected directly to the operating winding 49 of the relay while the generator field windings are shunted across the generator armature as previously explained. Then, if the generator output voltage remains low the relay remains in its normal position and the indicator light 57 is connected to the battery 54 and is energized. Or, if the generator output voltage rises to its rated value the relay will trip and the battery 54 will energize the light 60 indicating a defective regulator.

With specific reference to FIGURE 4, the relay may be actuated the same as previously described with regard to FIGURE 3 but now the positions of the two indicator lamps 57 and 60 are interchanged relative to the relay contacts by the switch 36b. It will be recalled that the circuit illustrated in FIGURE 4 exists when a high meter reading was initially obtained and the field winding circuit disconnected. With the field winding circuit disconnected, if the generator output falls to a low value and cannot trip the relay, as would be expected with a properly operating generator, the relay will not trip and the battery 54 will energize the indicator light 60. On the other hand, if the generator is faulty and remains at its high output regardless of the fact that the field winding circuit has been disconnected, the relay will trip and the battery 54 will energize the indicator light 57.

If desired, means may be provided to momentarily short the battery and generator terminals on the regulator before the engine is started in order to correctly polarize the generator with respect to the battery. This may include a push-button switch in the test apparatus that is connected to these two terminals.

It is apparent that a novel and useful testing apparauts for automotive voltage regulators and generators has been provided. The test apparatus is very rugged and dependable and has, as its greatest advantage, simplicity. All that the operator is required to do is connect the test apparatus into the automotive electrical circuit, obtain a meter reading, and then press one of two buttons as directed by the meter and observe which of two lights are energized. Since the test apparatus is rugged and inexpensive as well as very simple it can be purchased and operated by relatively inexperienced operators in filling stations and small garages.

In regard to the metering circuit 32, one set of values for the components that has proved to give very satisfactory results is as follows:

|  | Ohms |
| --- | --- |
| Resistors 37 and 38 | 2210 |
| Resistor 40 | 500 |
| Resistor 41 | 125 |
| Resistor 42 | 100 |
| Resistor 44 | 100 |

It will be apparent that modifications and variations may be effected without departing from the scope of the novel concepts of the present invention, and it will be understood that the application is to be limited only by the scope of the appended claims.

I claim as my invention:

1. A test apparatus for automobile generators, alternators and voltage regulators comprising (a) coupling means comprising first, second, third, fourth and fifth couplings for connection to the ungrounded terminal of an automobile battery, the battery terminal of an automobile voltage regulator, the field terminal of the automobile voltage regulator, the field terminal of an automobile generator and the generator terminal of the automobile voltage regulator, respectively; and a sixth coupling for connection to the automobile ground;

(b) a metering circuit;

(c) circuit means including respective first pairs of normally closed contacts of respective first and second multiple contact switch means connecting said metering circuit between said second and sixth couplings;

(d) said metering circuit having means for indicating the voltage between said second and sixth couplings and being capable of indicating whether said voltage is below, within or above a predetermined voltage range;

(e) a voltage responsive indicating apparatus for connection between said fifth coupling and ground and being differently responsive to voltages between said fifth coupling and ground which are respectively above and below a predetermined voltage corresponding to a predetermined rated output voltage from said generator;

(f) said first multiple contact switch means having second normally closed contacts controlling continuity between said third and fourth couplings, having third normally open contacts controlling continuity between said fourth coupling and ground, and having fourth normally open contacts controlling connection of said voltage responsive indicating apparatus between said fifth coupling and ground; said first and second normally closed contacts of said first switch means being opened, and said third and fourth normally open contacts being closed, in response to actuation of said first switch means; whereby upon actuation of said first switch means a voltage indication of said voltage responsive indicating apparatus below said predetermined voltage indicates a generator failure and a voltage indication of said voltage responsive indicating apparatus above said predetermined voltage indicates a voltage regulator failure, where the metering circuit indicating means shows a voltage between said second and sixth couplings below said predetermined voltage range prior to actuation of said first or second switch means; and (g) said second multiple contact switch means having second normally closed contacts controlling continuity between said third and fourth couplings and being in series with said second contacts of said first switch means, and having third normally open contacts controlling connection of said voltage responsive indicating apparatus between said fifth coupling and ground and being disposed in parallel with respect to said fourth normally open contacts of said first switch means; said first and second normally closed contacts of said second switch means being opened, and said third normally open contacts of said second switch means being closed, in response to actuation of said second switch means; whereby upon actuation of said second switch means with said first switch means in normal non-actuated condition a voltage indication of said voltage responsive indicating apparatus below said predetermined voltage indicates a voltage regulator failure and a voltage indication above said predetermined voltage indicates a generator failure, where the metering circuit indicating means shows a voltage between said second and sixth couplings above said predetermined voltage range prior to actuation of said first or second switch means.

2. The test apparatus of claim 1 with (h) said metering circuit including a circuit having a bridge type configuration with four arms and a voltmeter connected to sense an unbalance, and resistance means connected into the bridge circuit to compensate for variations in ambient temperature.

3. The test apparatus of claim 1 with (h) said voltage responsive means including a relay connected between said fifth coupling and ground upon actuation of said first or second multiple contact switch means and actuated in response to a voltage between said fifth coupling and ground above said predetermined voltage; said relay having first and second indicator lights controlled thereby; and (i) means comprising the contacts of said relay and further contacts of said first and second multiple contact switch means for energizing said first indicator light when the first switch means is actuated and said relay remains deenergized, for energizing said first indicator light when the second switch means is actuated and said relay is actuated; for energizing said second indicator light when the first switch means is actuated and said relay is actuated, and for energizing said second indicator light when said second switch means is actuated and said relay remains deenergized; whereby energization of said first indicator light will always indicate a faulty generator and energization of said second indicator light will always indicate a defective regulator.

References Cited in the file of this patent

UNITED STATES PATENTS

| | | |
|---|---|---|
| 2,686,293 | Davis | Aug. 10, 1954 |
| 2,780,777 | Sammis et al. | Feb. 5, 1957 |